(12) United States Patent
Taylor et al.

(10) Patent No.: US 11,695,262 B2
(45) Date of Patent: Jul. 4, 2023

(54) BRACKET MOUNTABLE ELECTRICAL BOX

(71) Applicant: ABB Schweiz AG, Baden (CH)

(72) Inventors: Phillip Taylor, Germantown, TN (US); Bobby Taylor, Hernando, MS (US)

(73) Assignee: ABB SCHWEIZ AG, Baden (CH)

( * ) Notice: Subject to any disclaimer, the term of this patent is extended or adjusted under 35 U.S.C. 154(b) by 338 days.

(21) Appl. No.: 16/941,794

(22) Filed: Jul. 29, 2020

(65) Prior Publication Data

US 2022/0037868 A1 Feb. 3, 2022

(51) Int. Cl.
*H02G 3/08* (2006.01)
*H02G 3/14* (2006.01)
*H02G 3/12* (2006.01)

(52) U.S. Cl.
CPC ............ *H02G 3/085* (2013.01); *H02G 3/121* (2013.01); *H02G 3/14* (2013.01)

(58) Field of Classification Search
CPC ........... H02G 3/085; H02G 3/121; H02G 3/14
USPC ......................................................... 220/3.2
See application file for complete search history.

(56) References Cited

U.S. PATENT DOCUMENTS

| | | | | |
|---|---|---|---|---|
| 1,962,317 A * | 6/1934 | Mangin | ................. | H02G 3/085 220/268 |
| 1,974,268 A * | 9/1934 | Givens | ................ | H02G 3/0683 285/194 |
| 3,980,197 A * | 9/1976 | Ware | ...................... | H02G 3/123 220/3.6 |
| 5,744,753 A * | 4/1998 | Nattel | .................... | H02G 3/081 220/3.3 |
| 7,549,549 B1* | 6/2009 | Kiely | ..................... | H02G 3/126 220/3.7 |
| 7,659,477 B2* | 2/2010 | Korcz | .................... | H02G 3/126 174/53 |
| 2005/0092510 A1* | 5/2005 | Dinh | ....................... | H02G 3/125 174/58 |
| 2010/0108347 A1* | 5/2010 | Korcz | ................... | H02G 3/126 248/226.12 |
| 2014/0054285 A1* | 2/2014 | Kummer | ................ | H02G 3/081 220/3.3 |
| 2014/0318824 A1* | 10/2014 | Korcz | ..................... | H02G 3/08 174/50 |
| 2020/0169068 A1* | 5/2020 | Zhang | .................... | H02G 3/125 |

\* cited by examiner

*Primary Examiner* — J. Gregory Pickett
*Assistant Examiner* — Niki M Eloshway
(74) *Attorney, Agent, or Firm* — Greenberg Traurig, LLP

(57) ABSTRACT

A bracket mountable electrical box having a mounting assembly or device that can secure the electrical box to a mounting bracket. The mounting assembly or device can include one more arms that can define at least a portion of a channel that can receive the mounting bracket. The channel can be selectively closed, or at least partially deformable, in a manner that can assist in retaining the engagement between the mounting bracket and the mounting assembly or device, and thus the electrical box. Such configurations can accommodate securing the electrical box to the mounting bracket without at least the use of additional tools.

19 Claims, 13 Drawing Sheets

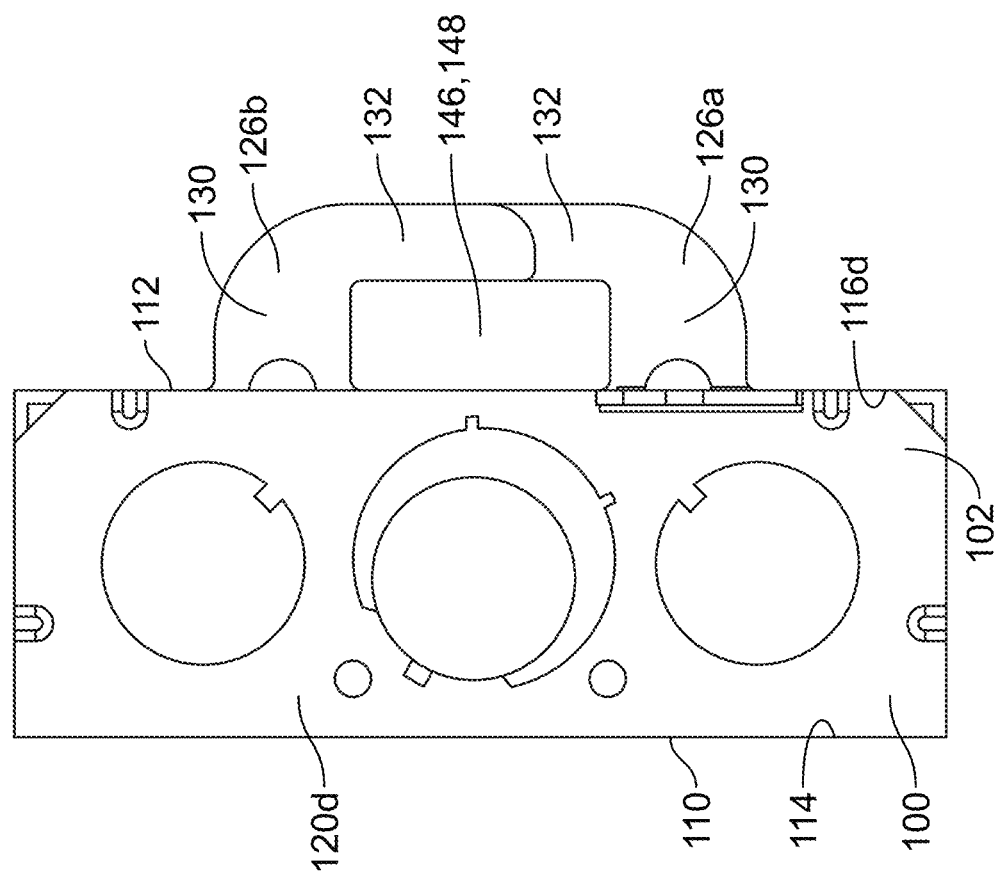
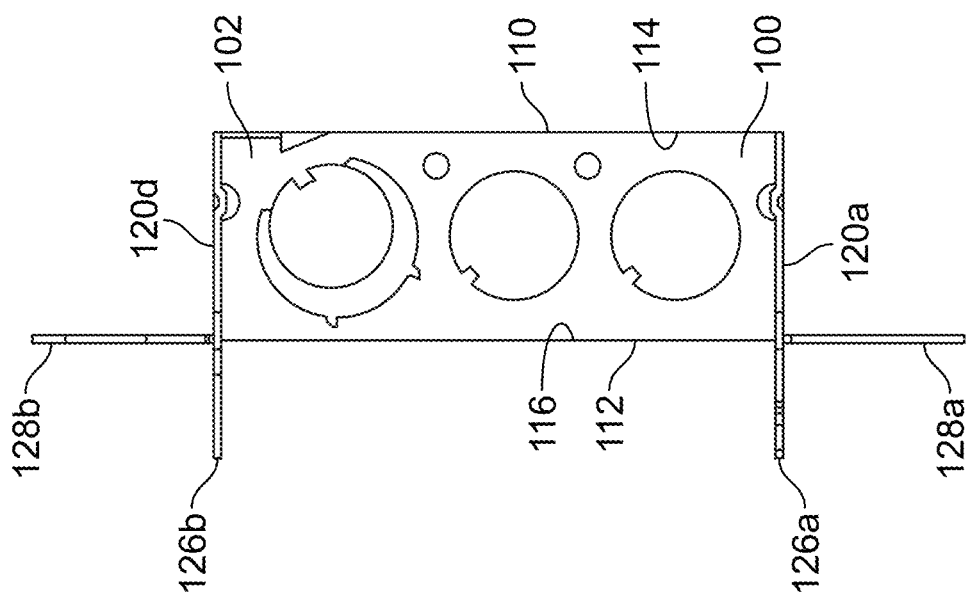

BRACKET MOUNTABLE ELECTRICAL BOX

BACKGROUND

Embodiments of the present invention generally relate to electrical boxes. More particularly, but not exclusively, embodiments of the present invention relate to electrical boxes that are adjustably mountable on brackets.

Electrical boxes can be used for a variety of applications, including, for example, in connection with the mounting and/or housing of electrical devices, such as, for example, outlets switches, and ceiling fixtures, as well as be used as junction boxes. Further, such boxes can be mounted in a variety of manners, including, but not limited to, on a bracket, including, but not limited to, telescoping brackets.

In at least some installations, electrical boxes are mounted at relatively high positions, which may require the installer to be positioned in or on an elevation device, such as, for example, a lift. Such elevations can increase the difficultly, complexity, and potential hazards associated with the mounting of the electrical box to the bracket, particularly if such mounting involves operation of a tool by the installer, and/or assembly of additional, intermediate mounting components to the electrical box and/or bracket.

Accordingly, although various bracket mountable electrical boxes are available currently in the marketplace, further improvements are possible to provide a means for providing a relatively simple and safe manner of mounting electrical boxes to brackets.

BRIEF SUMMARY

An aspect of an embodiment of the present application is a device that comprises an electrical box having a perimeter wall and a back wall, the perimeter wall and an inner surface of the back wall defining an inner region of the electrical box, the inner region extending to an open end at a front side of the electrical box. The device can further include a mounting assembly that can be coupled to a rear side of the electrical box, the mounting assembly comprising a first clip, a second clip, a first tab, and a second tab. The first and second clips can be on opposing sides of the electrical box, and can each comprise a first leg and a second leg, the first leg extending outwardly from the rear side of the electrical box, the second leg extending from, and being generally orthogonal to, the first leg. Further, the first and second tabs can be on opposing sides of the electrical box, and can each be selectively foldable from a first position to a second position. Further, the first tab can be adjacent to an end of the second leg of the first clip when at the second position, and the second tab can be adjacent to an end of the second leg of the second clip when at the second position. Additionally, the first clip and a portion of the back wall can be configured to define at least a portion of a first channel that is sized for placement of a portion of a mounting bracket, an open end of the first channel being open when the first tab is at the first position and closed when the first tab is at the second position. Further, the second clip and another portion of the back wall can be configured to define at least a portion of a second channel that is sized for placement of another portion of the mounting bracket, an open end of the second channel being open when the second tab is at the first position and closed when the second tab is at the second position.

Additionally, an aspect of an embodiment of the present application is a device comprising an electrical box having a perimeter wall and a back wall, the perimeter wall and an inner surface of the back wall defining an inner region of the electrical box, the inner region extending to an open end at a front side of the electrical box. The device can also include a mounting assembly that can have at least one hook body and at least one attachment segment. The at least one hook body can comprise a first leg and a second leg, the first leg being coupled to the back wall and extending in an outwardly direction away from the electrical box, and the second leg being coupled to a distal end of the first leg and extending in a downwardly direction. Additionally, the first leg, the second leg, and a portion of the back wall can define a channel that can be sized for placement of a portion of a mounting bracket. Further, at least one attachment segment can extend outwardly from a sidewall of the perimeter wall and away from the electrical box, and can include an aperture sized to receive placement of a fastener.

Another aspect of an embodiment of the present application is a device comprising a base portion positioned between a first paddle and a second paddle. The device can include a hanger clip that can outwardly extend from an inner wall of the base portion, the hanger clip including a first hook positioned and structured to engage a first portion of a wall of an electrical box. Additionally, the device can include a lever that can extend from a lower portion of the base portion and be positioned between the first and second paddles. The lever can be selectively displaceable relative to at least a portion of the base portion, and can include a hold clip that can outwardly extend from an inner surface of the lever, the hold clip including a second hook to engage a second portion of the wall of the electrical box. Further, each of the first and second paddles include an upper arm, a lower arm, and a base segment, the upper and lower arms being positioned on opposing sides of the base segment. The upper arm can include a first segment and a second segment, the first segment extending from the base segment to the second segment, the base segment and the second segment being positioned to engage opposing walls of a mounting bracket. Additionally, the lower arm can have a lower arm segment that can outwardly extend from the base segment, the lower arm segment and the first segment being positioned to be adjacent to opposing sides of the mounting bracket, the lower arm segment being selectively displaceable relative to at least a portion of the base segment.

BRIEF DESCRIPTION OF THE DRAWINGS

The description herein makes reference to the accompanying figures wherein like reference numerals refer to like parts throughout the several views.

FIGS. 5 and 6 illustrate top and right side views, respectively, of the electrical box shown in FIG. 1.

Figure 1:
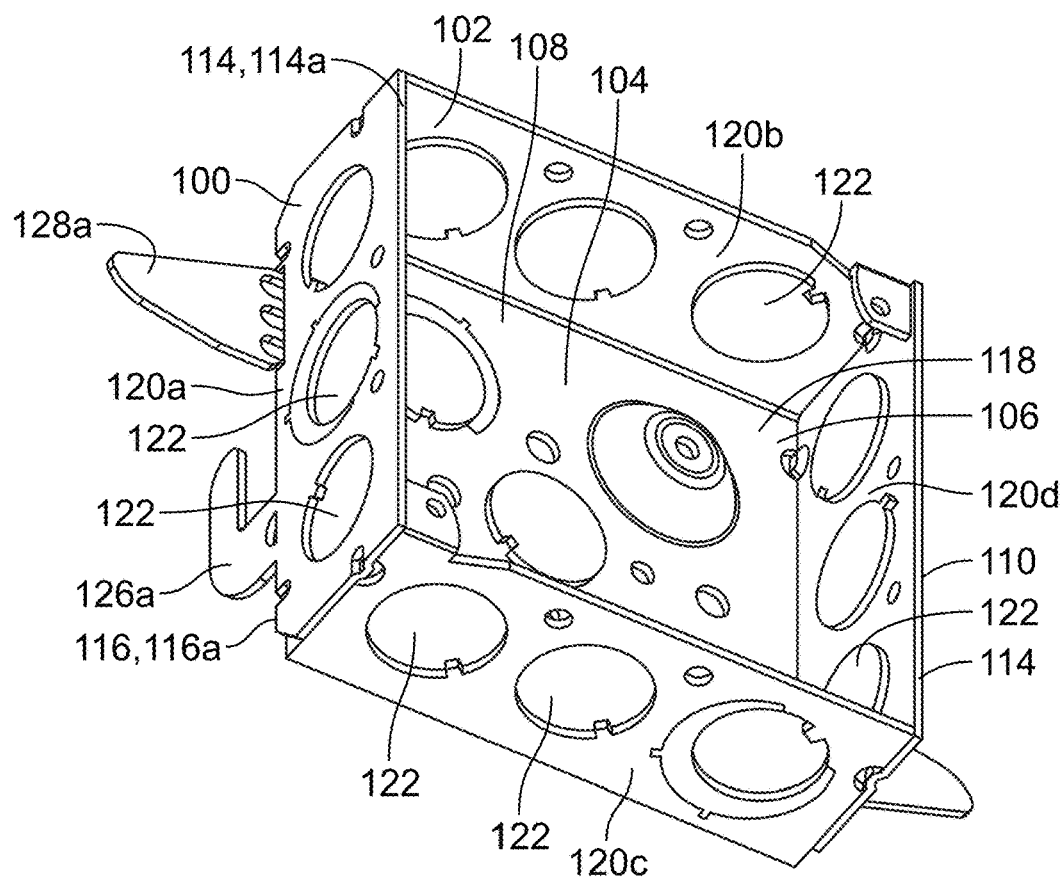
FIG. 1 illustrates a bottom side perspective view of an electrical box according to an embodiment of the subject application.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

Figure 2:
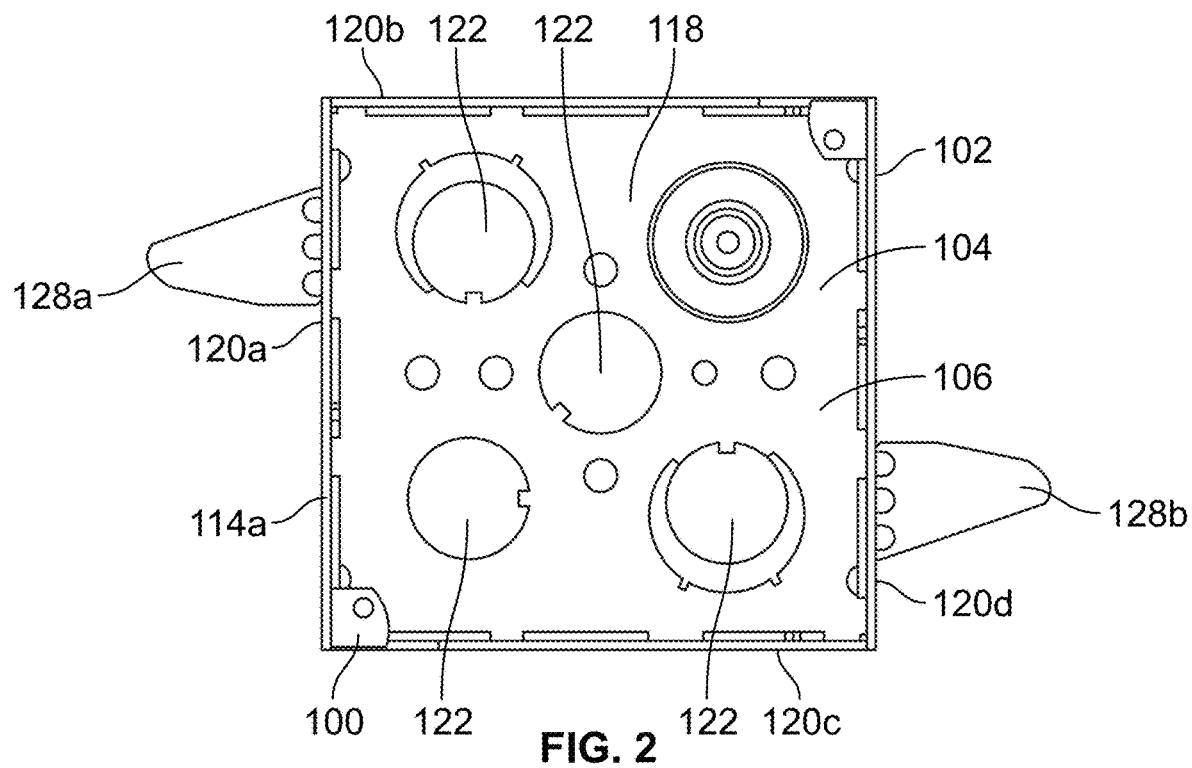
FIG. 2 illustrates a front side view of the electrical box shown in FIG. 1.

FIGS. 1 and 2 illustrate a bottom side perspective view and a front view, respectively, of an electrical box 100 according to an illustrated embodiment of the subject application. The electrical box 100 can comprise a perimeter wall 102 and a back wall 104. The perimeter wall 102 and the back wall 104 can be constructed from a variety of different materials, including, for example, metallic materials. For example, according to certain embodiments, the perimeter wall 102 and back wall 104 can be constructed from a 1/16 inch (1.5 mm) thick sheet or roll of metal.

The perimeter wall 102 and the back wall 104 can generally define an inner region 106 of the electrical box 100. According to the illustrated embodiment, the electrical box 100 can have an open end 108 at a front side 110 of the electrical box 100 that opposes the back wall 104 that is positioned generally at the rear side 112 of the electrical box 100, the open end 108 being in fluid communication with the inner region 106. The open end 108 can, when the electrical box 100 is installed in an associated application, be at least partially covered, such as, for example, by an electrical device, cover, fixture, or wall, as well as a combination thereof. Further, the electrical box 100 can have a box depth within the inner region 106 that extends between upper and lower edges 114, 116 of the perimeter wall 102, and/or between an upper edge 114 of the perimeter wall 102 and an inner surface 118 of the back wall 104.

The electrical box 100 can have a unitary, monolithic construction, or can be constructed by joining two or more components of the electrical box 100, such as, for example, via mechanical connections or engagements and/or spot welds, among other manners of joining the components of the electrical box 100. For example, according to the illustrated embodiment, the sidewalls 120a-d can comprise a separate first sidewall 120a and a separate second sidewall 120d that are secured to a monolithic body that comprises a third sidewall 120b, a fourth sidewall 120c, and the back wall 104, the third and fourth sidewalls 120b, 120c being adjoined to opposite sides of the back wall 104. According to such an embodiment, the first and second sidewalls 120a, 120d can be positioned on opposing sides of the electrical box 100.

As shown in at least FIG. 1, one or more of the sidewalls 120a-d, and/or the back wall 104, can include one or more removable knockouts 122. According to certain embodiments, the knockouts 122 can be partially stamped portions of the sidewalls 120a-d or back wall 104 that can be selectively removable to provide a knockout opening. Such a knockout opening(s) can extend through the associated sidewall 120a-d or back wall 104, and be in fluid communication with the inner region 106 of the electrical box 100. Thus for example, removal of a knockout 122 can provide an opening in the sidewall 120a-d or back wall 104 that allows for the passage of cables, wires, or conduit, among other components, through the associated sidewall 120a-d and into the inner region 106 of the electrical box 100. The number and size of knockouts 122, if any, can vary for each sidewall 120a-d, back wall 104, and/or electrical box 100.

In the illustrated embodiment, the exemplary perimeter wall 102 is depicted as providing four sidewalls 120a-d that form a generally square or rectangular shape. However the perimeter wall 102 can have a variety of other shapes, sizes, and configurations. For example, the perimeter wall 102 can have a generally circular, oval, or non-circular shape, including, but not limited to, polygonal shapes. Additionally, according to certain embodiments, the perimeter wall 102 can, for example, have a height between the upper and lower edges 114, 116 of the perimeter wall 102 of about 2.5 inches or about 4 inches, among other sizes. Further, according to certain embodiments, each sidewall 120a-d can have a length between opposing ends of the sidewall 120a-d of about 4 inches, among other lengths.

Figure 3:
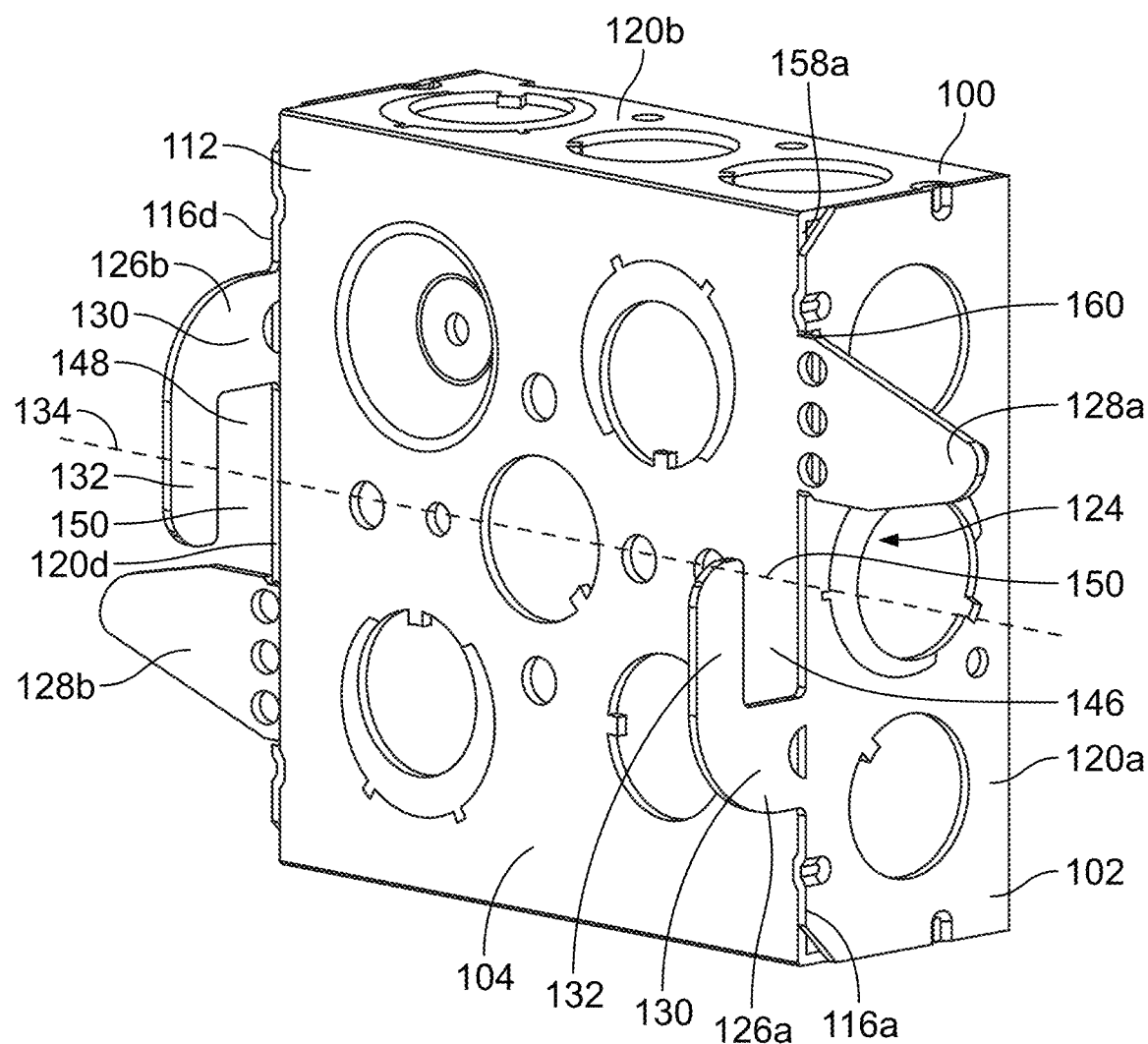
FIGS. 3 and 4 illustrate rear side perspective views of the electrical box shown in FIG. 1.
Figure 4:
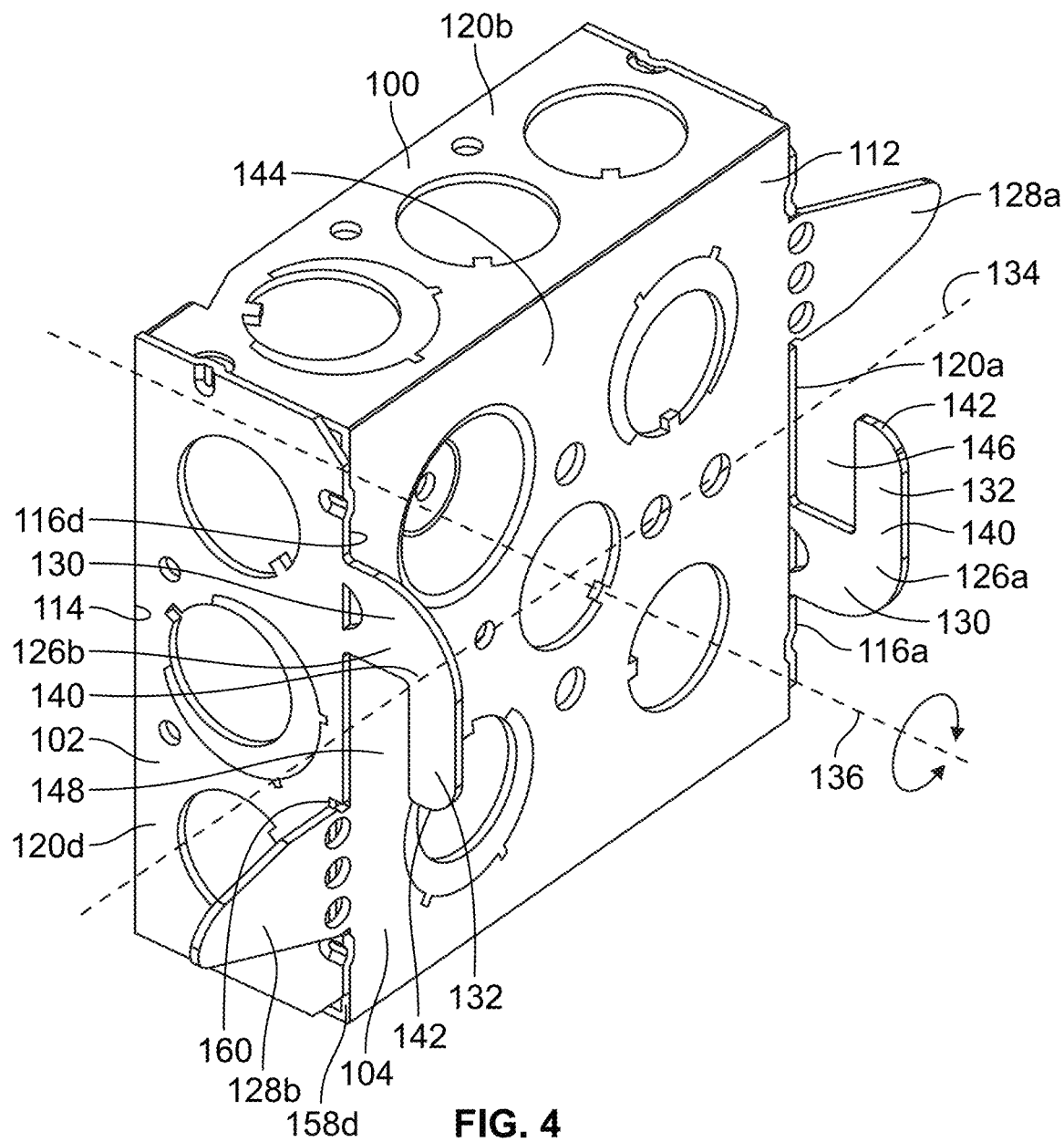

As seen in at least FIGS. 3 and 4, the electrical box 100 includes a mounting assembly 124 comprising at least one pair of clips 126a, 126b and at least one pair of tabs 128a, 128b that are configured to secure the electrical box 100 to a bracket without use of a tool, or separate components, including, for example screws or additional intermediate mounting components.

According to the illustrated embodiment, the at least one pair of clips 126a, 126b can include a first clip 126a and a second clip 126b. The first and second clips 126a, 126b can each comprise a first leg 130 and a second leg 132, the first leg 130 being generally orthogonal to the second leg 132. As seen in FIGS. 3-5, the first leg 130 of the first and second clips 126a, 126b can extend or protrude in generally the same outwardly direction away from the rear side 112 of the electrical box 100, and thus away from the electrical box 100. However, the first and second clips 126a, 126b can outwardly extend from generally opposite sides of the rear side 112 of the electrical box 100. For example, as seen in at least FIG. 3, the first leg 130 of the first clip 126a, and thus the first clip 126a, can outwardly extend from a lower edge 116 of a first sidewall 120a of the electrical box 100, and/or from a portion of back wall 104 that is adjacent to the lower edge 116 of the first sidewall 120a. However, as seen in at least FIG. 4, the first leg 130 of the second clip 126b, and thus the second clip 126b, can outwardly extend from a second sidewall 120d that opposes the first sidewall 120a, and/or from a portion of back wall 104 that is adjacent to the lower edge 116 of the second sidewall 120d.

The vertical location at which the first leg 130 of the first clip 126a outwardly extends away from the rear side 112 of the electrical box 100 can be offset from the vertical location at which the first leg 130 of the second clip 126b outwardly extends away from the rear side 112 of the electrical box 100. For example, referencing the angular orientation of the electrical box 100 shown in FIGS. 3 and 4, the first leg 130 of the first clip 126a and the first leg 130 of the second clip 126b can be on opposing sides of a vertical centerline 134 that is generally positioned at a central location between, and parallel to, the third and fourth sidewalls 120b, 120c. According to certain embodiments, the first legs 130 of the first and second clips 126a, 126b can be located generally same distance away, but in opposite directions, from the vertical centerline 134. As discussed below, such positioning and spacing of the first legs 130 of the first and second clips 126a, 126b can assist with the electrical box 100 being rotated about a rotational axis 136 (FIG. 4) such that a mating bracket 138 (FIG. 7B) can be securely engaged by at least the first and second clips 126a, 126b.

Figure 7A:
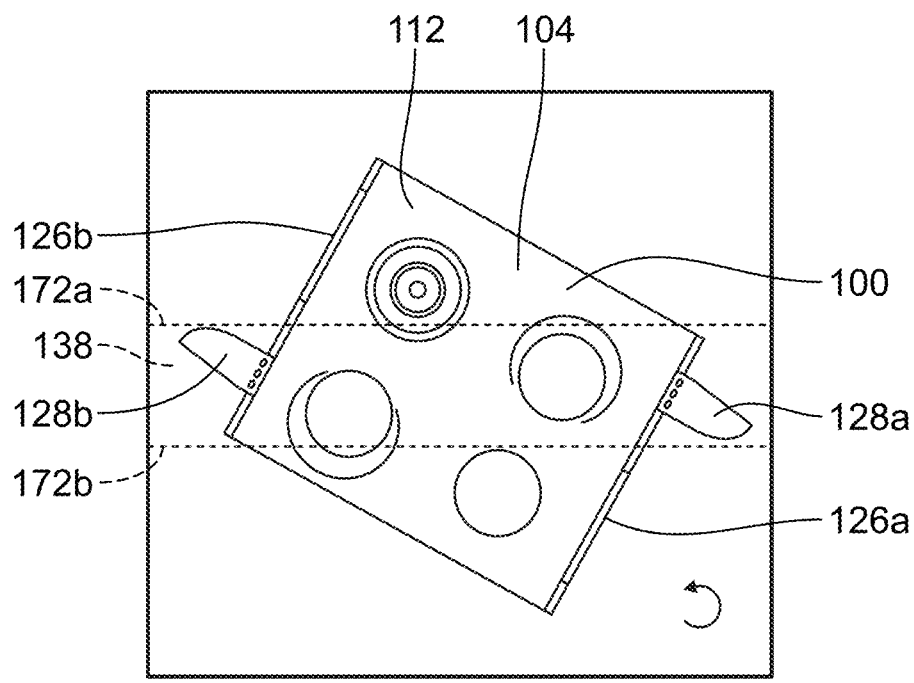
FIG. 7A illustrates the electrical box shown in FIG. 1 at a first angular orientation relative to an exemplary mounting bracket.
Figure 7B:
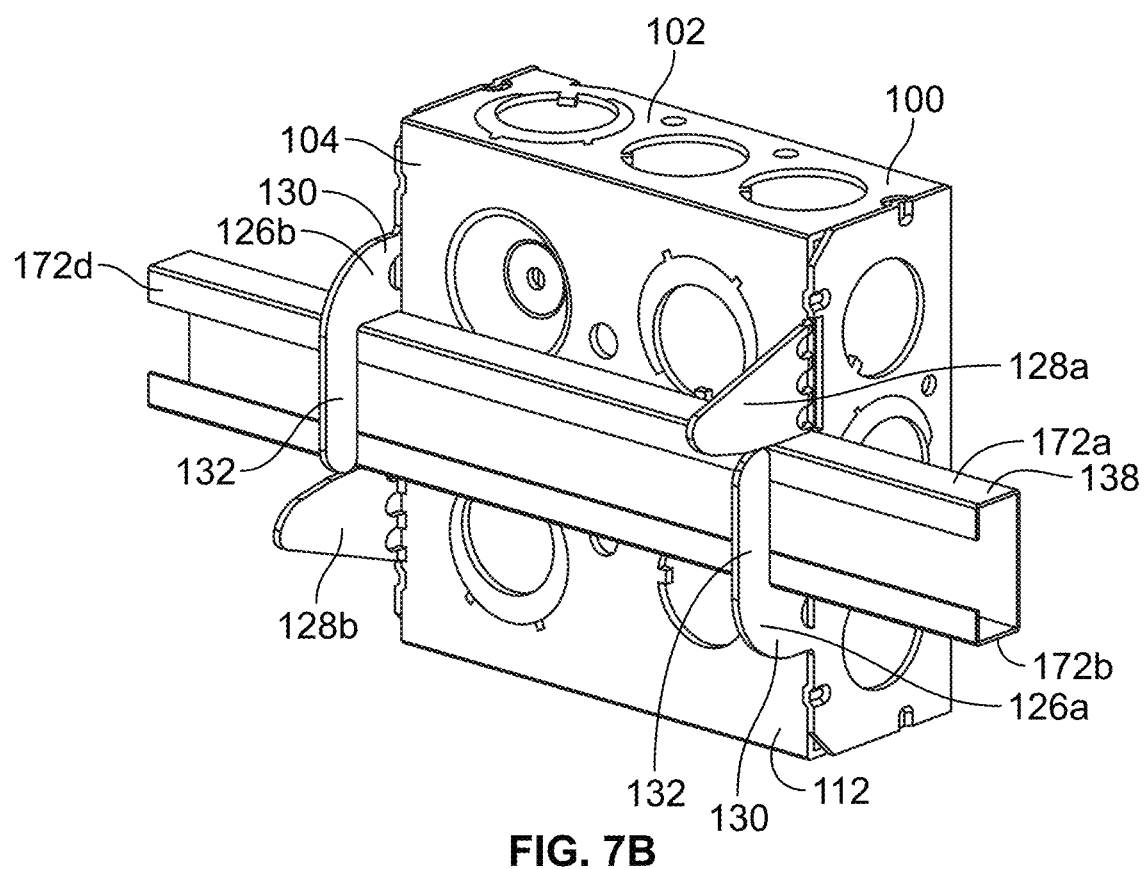
FIG. 7B illustrates a rear side perspective view of the electrical box shown in FIG. 1 both at a second angular orientation relative to the exemplary mounting bracket and securely mounted to the mounting bracket.

As seen in FIG. 4, the second legs 132 of the first and second clips 126a, 126b can include a proximate end 140 and a distal end 142, the proximate end 140 being attached to the first leg 130. Additionally, the second legs 132 of the first and second clips 126a, 126b can extend from the associated first leg 130 in opposing directions. For example, as seen in FIG. 3, the second leg 132 of the first clip 126a can extend in a generally upward direction toward the third sidewall 120b, while the second leg 132 of the second clip 126b extends in an opposing generally downward direction toward the opposing fourth sidewall 120c. According to such an embodiment, inner surfaces of the first and second legs 130a, 132b of the first clip 126a and an adjacent portion of the outer surface 144 of the back wall 104 can generally define a first channel 146, as seen in FIG. 7B. Similarly, the inner surfaces of the first and second legs 130, 132 of the second clip 126b and an adjacent portion of the outer surface 144 of the back wall 104 can generally define a second channel 148 that is sized and configured to receive placement of another portion of the bracket 138 to which the electrical box 100 is to be mounted.

The first and second channels 146, 148 can also include an open end 150 between a distal end 142 of the second leg 132 and the adjacent outer surface 144 of the back wall 104. Thus, according to the illustrated embodiment, for each of the first and second clips 126a, 126b, the open end 150 and associated first leg 130 can be at opposing ends of the corresponding first and second channel 146, 148, as seen in at least FIGS. 3 and 4. Further, the open ends 150 of the first and second channels 146, 148 can be sized to accommodate at least rotational insertion of the bracket 138 into the first and second channels 146, 148 as the electrical box 100 is rotated relative to the bracket 138 about the rotational axis 136, as discussed below.

Thus, as seen in at least FIG. 6, the first and second clips 126a, 126b can be configured and positioned such that the first channel 146 is generally aligned with the second channel 148. Such alignment of the first and second channels 146, 148 can accommodate the bracket 138 simultaneously extending through both of the first and second channels 146, 148, as seen in FIG. 7B. Accordingly, the inner surfaces 152, 154 (FIG. 8) of the first leg 130 of the first and second clips 126a, 126b may be parallel to each other, and extend similar distances away from the outer surface 144 of the back wall 104. Further, the inner surface 152 of the first leg 130 for each of the first and second clips 126a, 126b can be generally orthogonal to the back wall 104. Additionally, the inner surfaces 154 of the second legs 132 of the of the first and second clips 126a, 126b, can be parallel to each other, as well as offset by similar distances away from the associated adjacent outer surface 144 of the back wall 104. Further, the inner surfaces of the second leg 132 for each of the first and second clips 126a, 126b can be generally parallel to the back wall 104 such that the first and second channels 146, 148 have generally rectangular configurations.

Figure 8:
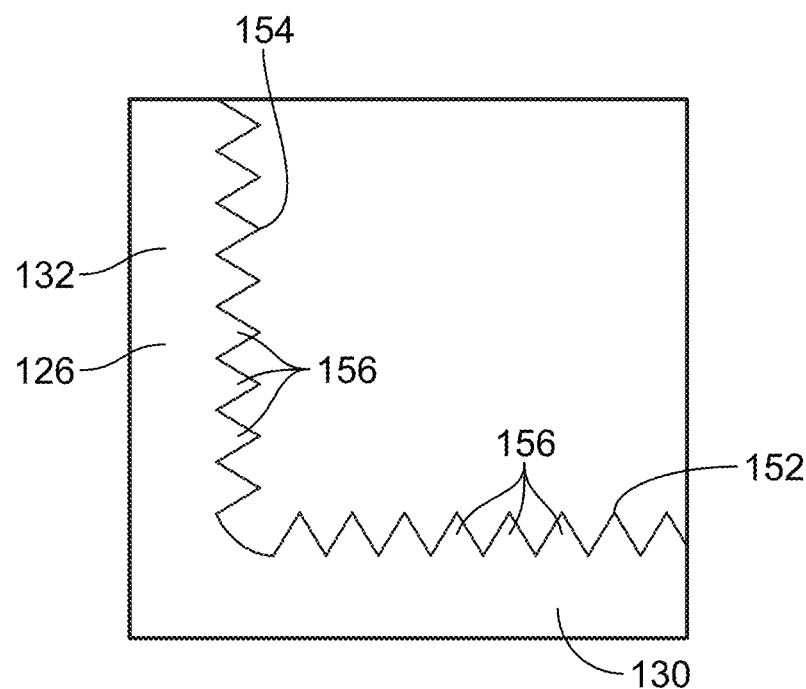
FIG. 8 illustrates a side view of serrated inner surfaces for exemplary first and second legs for the electrical box shown in FIG. 1.
Figure 9:
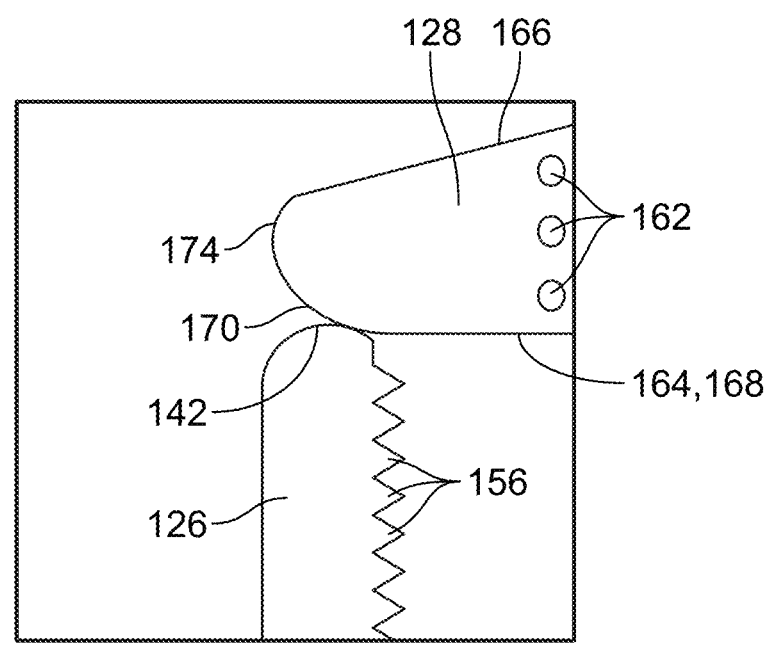
FIG. 9 illustrates a side view of an engagement between a clip and a tab of an exemplary mounting assembly for the electrical box shown in FIG. 1.

Referencing FIGS. 8 and 9, the inner surface(s) 152, 154 of at least one of the first leg 130 and second leg 132 for either or both of the first and second clips 126a, 126b (referred to as clip 126 in FIGS. 8 and 9) can include a plurality of serrations or teeth 156. The plurality of teeth 156 can assist the associated first and/or second clip(s) 126a, 122b in securely gripping or engaging an adjacent surface of the bracket 138 in a manner that may at least assist in preventing or resisting slidable displacement of the electrical box 100 along the bracket 138. The plurality of teeth 156 can extend along all, or a portion(s), of the inner surface 152, 154 of the first and/or second leg(s) 130a, 132b.

With respect to the first and second tabs 128a, 128b, as seen in at least FIGS. 1-5, the first and second tabs 128a, 128b can at least initially outwardly extend from the electrical box 100 in a direction that is generally orthogonal to the direction at which the first and second clips 126a, 126b extend for the electrical box 100. Thus, according to certain embodiments, the first and second tabs 128a, 128b can be coplanar with each other, and may also be coplanar with the back wall 104. Further, according to certain embodiments, the first tab 128a, second tab 128b, and back wall 104 can be part of a unitary, monolithic structure.

As seen in FIGS. 1-5 and 7A, the first tab 128a can at least initially be at a first position at which the first tab 128a extends from the electrical box 100, such as, for example, from a first edge 116a of the back wall 104 or the lower edge 116 of the first sidewall 120a in an outward direction that is generally orthogonal to the first sidewall 120a. Moreover, according to certain embodiments, the first tab 128a can extend from the first edge 158a of the back wall 104 through an open ended slot 160 in the first sidewall 120a. Similarly, the second tab 128b can at least initially be at a first position at which the second tab 128b extends from the electrical box 100, such as, for example, from a second edge 158d of the back wall 104 or the lower edge 116d of the second sidewall 120d in an outward direction that is generally orthogonal to the second sidewall 120d. Moreover, according to certain embodiments, the second tab 128b can extend from the second edge 116d of the back wall 104 through an open ended slot 160 in the second sidewall 120d.

As seen in at least FIG. 3, similar to the first and second clips 126a, 126b, the first and second tabs 128a, 128b can be on opposing sides of the vertical centerline 134. Further, the first clip 126a and first tab 128a, which are generally positioned on the same side of the electrical box 100, such as, for example, part of and/or adjacent to the first sidewall 120a, can be on opposing sides of the vertical centerline 134. According to such an embodiment, the first tab 128a can be bent from the first position to a second position, as shown, for example, in FIG. 7B, at which the first tab 128a extends over and/or across at least a portion of the first channel 146 and/or the open end 108 of the first channel 146 in a manner that can at least assist in retaining the bracket 138 in the first channel 146, as indicated in FIGS. 7B and 9. Similarly, the second clip 126b and second tab 128b, which are generally positioned on the same side of the electrical box 100, such as, for example, part of and/or adjacent to the second sidewall 120d, can be on opposing sides of the vertical centerline 134. As seen in FIG. 7B, according to such an embodiment, the second tab 128b can be bent from the first position to a second position at which the second tab 128b extends over and/or across at least a portion of the second channel 148 and/or the open end 108 of the second channel 148 in a manner that can at least assist in retaining the bracket 138 in the second channel 148.

The first and second tabs 128a, 128b can have a variety of shapes and configurations. For example, FIG. 9 illustrates a side view of an exemplary first or second tab 128a, 128b (collectively referred to as tab 128). As seen, according to certain embodiments, the tab 128 can include features that can assist in the ease at which installer can bend the tab 128 from the first positon, as seen in FIGS. 3 and 7A, to the second position, as seen, for example, in FIG. 7B. Moreover, such features may facilitate the installer being able to bend the tab 128 without use of a tool. For example, according to certain embodiments, such features can include areas in which the thickness of the tab 128 at or around a bending or folding location is reduced and/or areas in which material has been removed. For example, according to the illustrated embodiment, the tab 128 can include a plurality of apertures 162 that are positioned along or around a location at which the bending of the tab 128 is to occur.

As also seen in at least FIG. 9, the tab 128 can include a first edge 164 and an opposing second edge 166. A first segment 168 of the first edge 164 can generally outwardly extend away from the back wall 104 and/or adjacent the first or second sidewall 120a, 120d to a second segment 170 of the first edge 164. The first segment 168 can have a length that covers at least a portion, if not all, of the open end 108 of the adjacent first or second channel 146, 148. Further, at least a portion of the first segment 168 is configured to engage at least a portion of an opposing surface of the bracket 138 when the bracket 138 is positioned in the associated first or second channel 148. Such engagement can, according to certain embodiments, and at least when the tab 128 is at the second position, result in the bracket 138 being at least partially pressed between the first leg 130 of the clip 126a, 126b and the opposing tab 128. Such forces can at least assist in maintaining a position of the electrical box 100 relative to the bracket 138. Thus, for example, according to certain embodiments, the first segment 168 can have a size and shape that facilitates the first segment 168 engaging an opposing surface of the bracket 138 when the tab 128 is at the second position. Moreover, the first segment 168 of the tab 128 can be configured for such engagement between the first segment 168 and the bracket 138 to occur at one or more positions along the bracket 138. For example, according to certain embodiments, the first segment 168 can have a sloped shape or configuration such that the first segment 168 engages a point, or portion, of an adjacent surface of the bracket 138, thereby delivering a force against the bracket 138 at a particular location. Alternatively, the first segment 168 can have a shape that generally conforms to and/or mates a shape of the bracket 138 across a side of the bracket 138, such as, for example, across at least a portion of an upper or lower wall 172a, 172b of the bracket 138. Thus, for example, according to certain embodiments, the first segment 168 can have a shape that is generally parallel to the shape of the adjacent wall 172a, 172b that the first segment 168 is to securely engage. Further, according to such an embodiment, when at a folded position, at least a portion of the first segment 168 of the first edge 164 can be generally aligned with the inner surface 152 of the first leg 130 that is on the opposite side of the electrical box 100.

The second segment 170 of the first edge 164 can extend from the first segment 168 to the second edge 166 and/or a transitional edge 174 between the first and second edges 164, 166. According to certain embodiments, the second edge 166 can be configured to securely engage, when the tab 128 is at the second position, the distal end 142 of the second leg 132 of the adjacent first or second clip 126a, 126b, as seen in FIG. 7B. Such engagement between second segment 170 of the tab 128 and the adjacent clip 126a, 126b can be configured to retain the tab 128 in engagement with the clip 126a, 126b so as to prevent at least inadvertent removal of the bracket 138 out of the associated first or second channel 146, 148. Thus, for example, according to certain embodiments, the second segment 170 can have a sloped shape or configuration such that the second segment 170 engages a point, or portion, of an adjacent surface of the second leg 132, thereby delivering a force against the second leg 132 at a particular location that may assist in retaining the tab 128 at the second position and/or in engagement with the second leg 132 of the clip 126a, 126b. Alternatively, the second segment 170 can have a shape that generally conforms to and/or mates a shape of the second leg 132 that the second segment 170 will, or does, engage. Thus, for example, according to certain embodiments, the second segment 170 can have a shape that is generally parallel to the shape of the adjacent surface of the second leg 132 that the second segment 170 is to securely engage.

As seen in FIG. 7A, when the electrical box 100 is to be mounted to the bracket 138, the electrical box 100 can be rotated about the rotational axis 136 (FIG. 4) to a first angular orientation relative to the bracket 138. At the first angular orientation, the electrical box 100 can be displaced such that the electrical box 100 can be linernally displaced to a position at which the bracket 138 can be adjacent to, and abut, a portion of the outer surface 144 of the back wall 104 that is between at least the first and second clips 126a, 126b. Moreover, the first angular orientation of the electrical box 100 can accommodate the bracket 138 being placed generally between the first and second clips 126a, 126b without interference from the first and second clips 126a, 126b. With the electrical box 100 and bracket 138 at such relative positons, rotation of the electrical box 100 to a second angular orientation can result in the first and second clips 126a, 126b being rotated in a direction in which the bracket 138 is received in the first and second channels 146, 148, as seen in FIG. 7B. For example, with respect to the example shown in FIG. 7A, with the bracket 138 being placed generally between the first and second clips 126a, 126b and adjacent to the back wall 104, the first and second channels 146, 148 can be positioned such that rotation of the electrical box 100 in a counterclockwise direction to the second angular orientation results in the bracket 138 being received in the first and second channels 146, 148. Such rotation can commence until the first leg 130 of the first clip 126a contacts the lower wall 172b of the bracket 138 and/or the first leg 130 of the second clip 126b contacts the upper wall 172a of the bracket 138. Moreover, as the first legs 130 of the first and second clips 126a, 126b are on opposing sides of the vertical centerline 134, when at the second angular orientation, the first legs 130 of the first and second clips 126a, 126b can be adjacent to opposing upper and lower walls 172a, 172b of the bracket 138. Thus, as the open ends 150 of the first and second channels 146, 148, in addition to the first legs 130, of the first and second clips 126a, 126b are on opposing sides of the bracket 138, such a configuration can enhance the ability of the mounting assembly 124 to securely engage the bracket 138, as well as further prevent inadvertent detachment and disconnection of the electrical box 100 from the bracket 138. With the bracket 138 positioned in the channels 146, 148 of the first and second clips 126a, 126b, each of the first and second tabs 128a, 128b can be generally inwardly bent from the first position to the second position so as to close the corresponding first or second channel 146, 148.

As previously discussed and shown in FIG. 7B, with the first and second tabs 128a, 128b in the second position, the tabs 128a, 128b can extend over at least a portion of the adjacent channel 146, 148 and/or be in engagement with the adjacent first or second clip 126a, 126b. Further, as the first and second tabs 128a, 128b are on opposing sides of the vertical centerline 134, first and second tabs 128a, 128b can be adjacent to opposing upper and lower walls 172a, 172b of the bracket 138. For example, as shown in FIG. 7B, the first tab 128a can be adjacent to, and can also engage, the upper wall 172a of the bracket 138, while the second tab 128b can be adjacent to, and can also engage, the lower wall 172b of the bracket 138. Moreover, according to the illustrated embodiment, when the electrical box 100 is securely mounted to the bracket 138, the first clip 126a and second tab 128b can both be adjacent to a portion of the lower wall 172b of the bracket 138, while the second clip 126b and the first tab 128a can both be adjacent to a portion of the upper wall 172a of the bracket 138.

Figure 10:
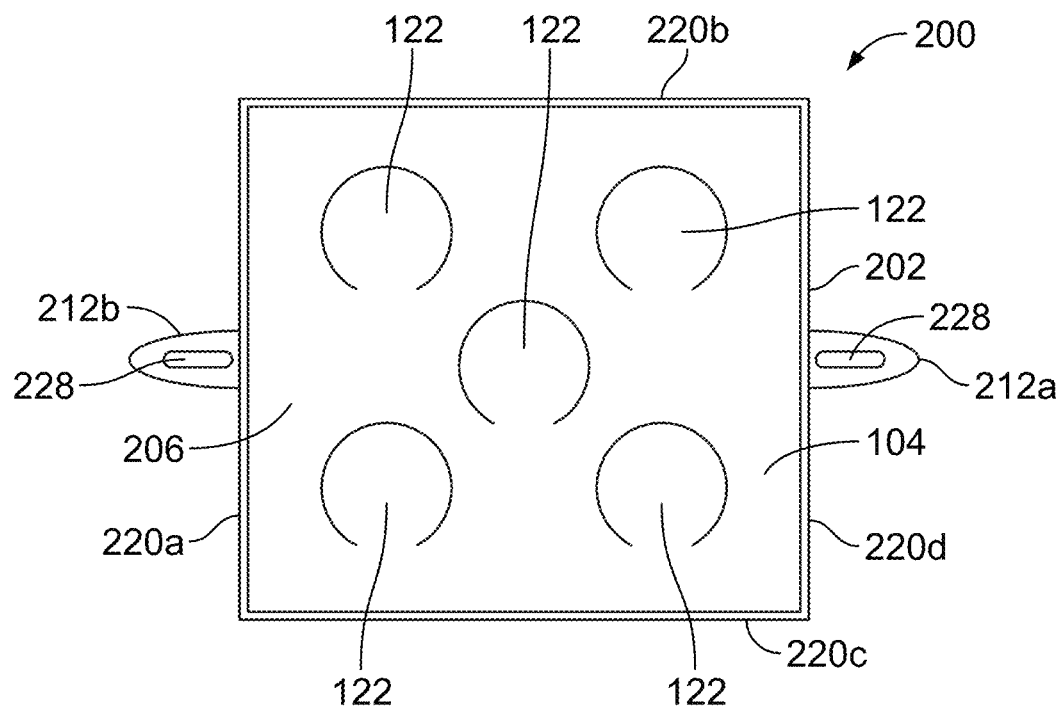
FIG. 10 illustrates a front view of a horizontally adjustable electrical box according to an embodiment of the subject application.

FIG. 10 illustrates a front view of a horizontally adjustable electrical box 200 according to an embodiment of the subject application. The electrical box 200 can include a perimeter wall 202 and back wall 204 that are similar to the perimeter wall 102 and back wall 104 of electrical box 100 discussed above with respect to FIG. 1. Further, the electrical box 200 can be constructed in similar manners, and from similar materials, as those discussed above with respect to the electrical box 100 shown in FIG. 1. Accordingly, the perimeter wall 202 can include a plurality of sidewalls 220a-d that can be configured to provide a variety of shapes and sizes for the electrical box 200. Additionally, the perimeter wall 202 and the back wall 204 can generally define an inner region 206 of the electrical box 200. The electrical box 200 can also include one or more knockouts 128 along the perimeter wall 202 and/or the back wall 204.

Figure 11:
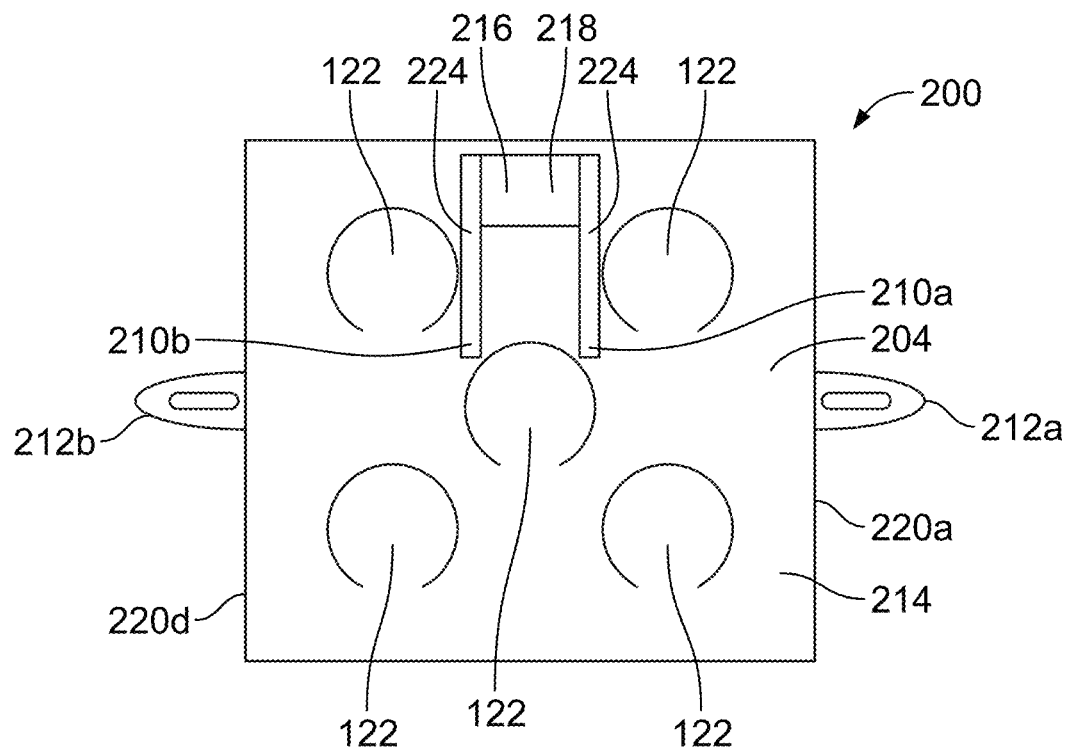
FIGS. 11 and 12 illustrate rear and side views, respectfully, of the electrical box shown in FIG. 10.
Figure 12:
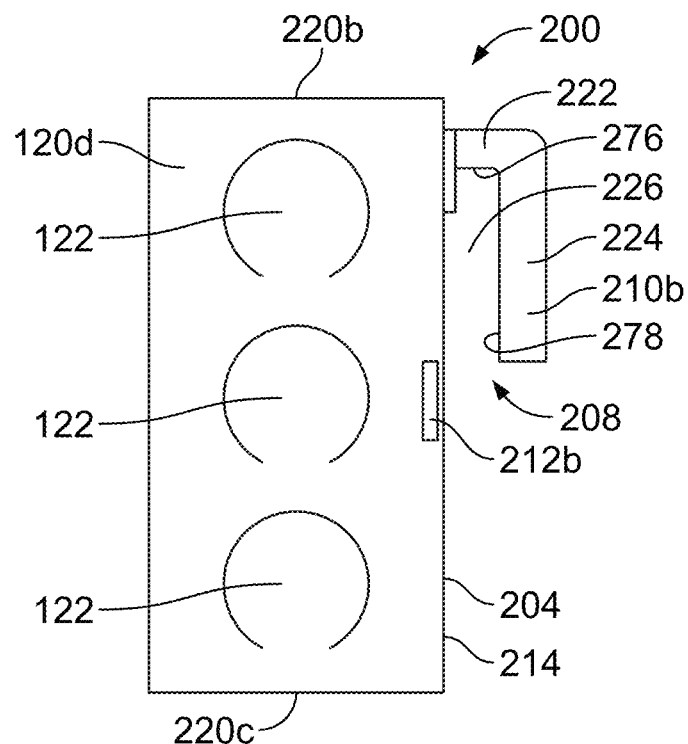

As shown in FIGS. 10-12, the electrical box 200 can also include a mounting assembly 208 that is adapted to accommodate horizontal adjustment in the placement of the electrical box 200 about the bracket 138, including, for example, about a telescoping screw gun bracket. According to the illustrated embodiment, the mounting assembly 208 can include one or more hook bodies 210a, 210b and one or more attachment segments 212a, 212b. For example, as seen in at least FIGS. 11 and 12, according to certain embodiments, the mounting assembly 208 includes a pair of hook bodies 210a, 210b, and more specifically, a first hook body 208a and a second hook body 208b. The first and second hook bodies 210a, 210b can at least outwardly extend from the outer side 214 of the electrical box 200. The first and second hook bodies 210a, 210b can be directly attached to the back wall 204, or, alternatively, can be connected to a mounting plate 218 that is secured to the back wall 204. Additionally, the first and second hook bodies 210a, 210b can be separated from each other, such as, for example, by a space or gap 216. the size of the gap 216 can be determined to prevent possible incidental rotational displacement of the electrical box 200 when the first and second hook bodies 210a, 210b are engaged with the mounting bracket 138, as well positioned to accommodate at least partial access to an adjacent knockout(s) 122 that may be positioned behind either of the first and second hook bodies 210a, 210b.

According to the illustrated embodiment, the first and second hook bodies 210a, 210b can include a first leg 222 that is extends from the outer side 214 of the back wall 204, or, alternatively, from the mounting plate 218. The first and second hook bodies 210a, 210b can also include a second leg 224 that is adjoined to the first leg 222. According to the illustrated embodiment, the second leg 224 is generally orthogonal to the first leg 222. Inner surfaces 276, 278 of the first and second legs 222, 224, respectively, and the adjacent portion of the outer side 214 of the back wall 204 can define channels 226 of the associated first and second hook bodies 210a, 210b, respectively, that are each sized and configured to receive placement of a portion of a bracket 138 to which the electrical box 200 is to be mounted. Additionally, similar to the first and second clips 126a, 126b discussed above, at least a portion of the inner surfaces 276, 278 of either or both of the hook bodies 210a, 210b can include a plurality of serrations or teeth 156 that can assist in the associated first and/or second hook bodies 210a, 210b securely gripping or engaging an adjacent surface of the bracket 138 in a manner that may at least assist in preventing or resisting slidable displacement of the electrical box 200 along the bracket 138.

One or more attachment segments 212a, 212b can extend from one or more of the sidewalls 220a-d of the electrical box 200, and are configured to receive insertion of a fastener, such as, for example, a screw, that can extend through the attachment segment 212 and into the bracket 138. According to the illustrated embodiment, a first attachment segment 212a can outwardly extend from the first sidewall 220a, and a second attachment segment 212b can outwardly extend from the second sidewall 220d. Further, according to the illustrated embodiment, the first and second attachment segments 212a, 212b can outwardly extend from the electrical box 200 in a direction that is generally orthogonal to the adjacent sidewall 220. The first and second attachment segment 212a, 212b can each also include an aperture 228 that is sized to accommodate passage of a shank portion, but not head portion, of the fastener through the attachment segment 212 such that the shank portion can securely engage the bracket 138 while the head portion of the fastener retains engagement of a portion of the attachment segment 212a, 212b between the head portion and the bracket 138.

During use of the electrical box 200, electrical box 200 can be displaced to a position at which the bracket 138 is positioned within the channels 226 of the first and second hook bodies 210a, 210b. The electrical box 200 can then be slide along the bracket 138 to a desired location. For example, with respect to brackets 138 that extend horizontally between wall studs, with the bracket 138 extending through the channels 226, the horizontal positon of the electrical box 200 can adjusted by horizontally sliding the electrical box 200 along the bracket 138. Upon being positioned at a selected horizontal position, a fastener can be inserted through the aperture 228 of each attachment segment 212a, 212b, thereby securely fastening the electrical box 200 to the bracket 138 at a selected position.

Figure 18:
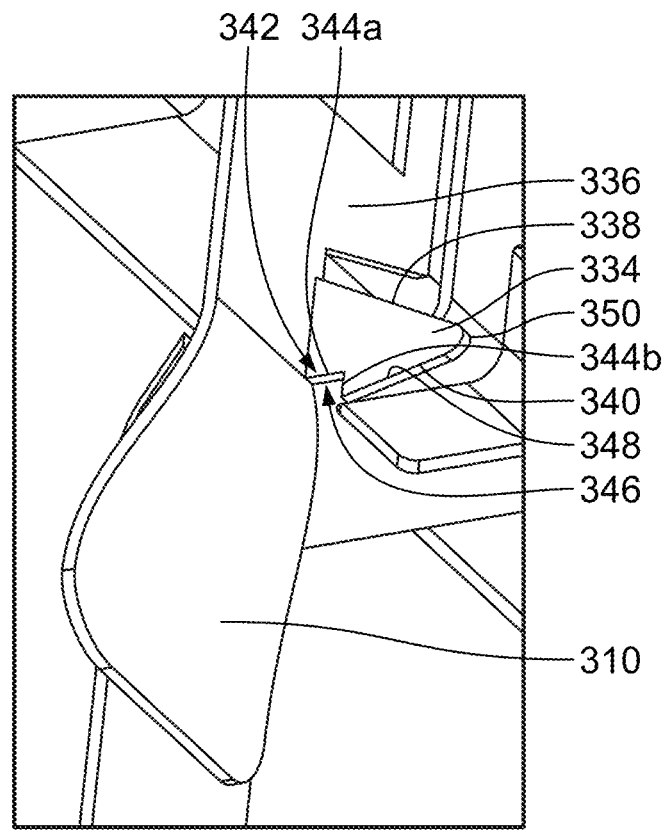
Figure 19:
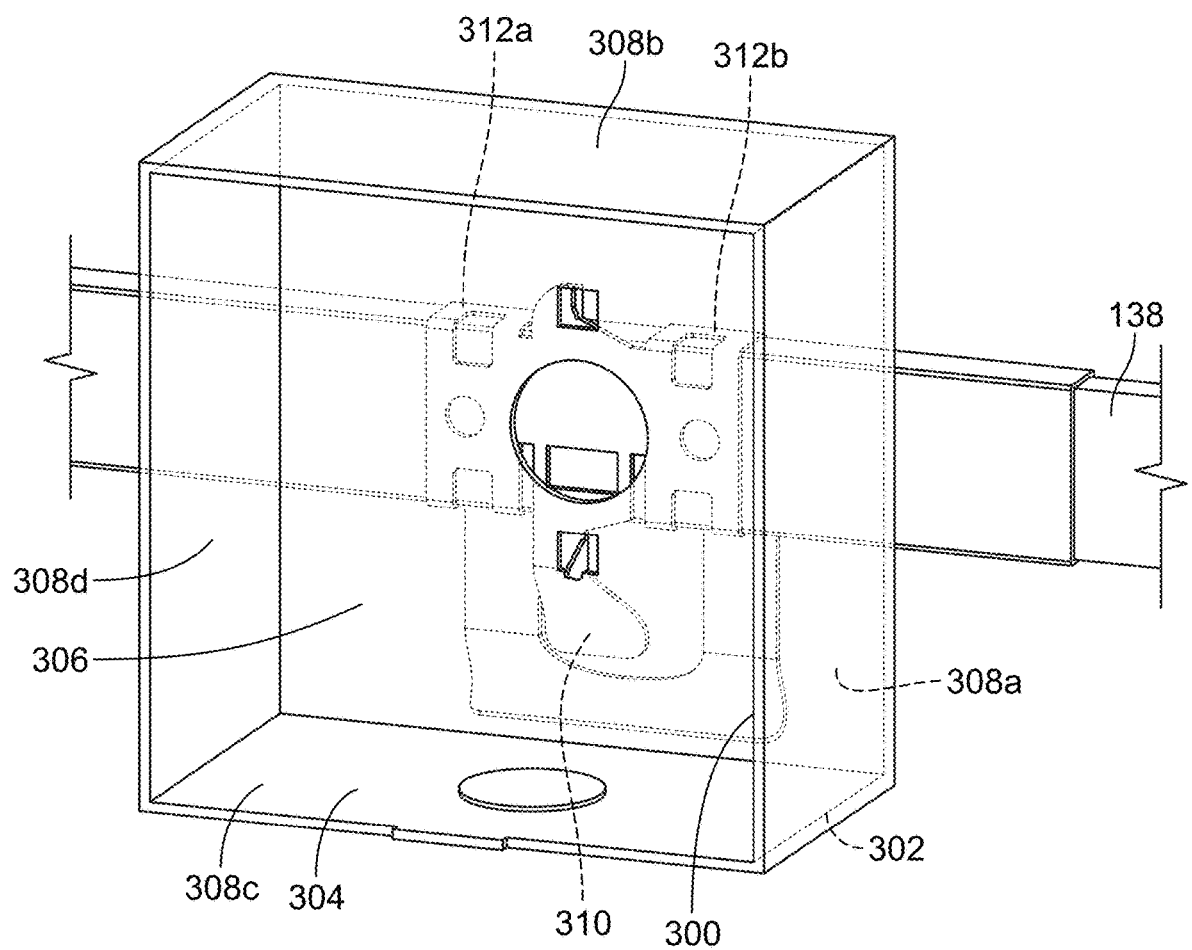
FIG. 19 illustrates a rear side perspective view of the box clip shown in FIG. 14 mounted to both an electrical box and an exemplary bracket.

FIGS. 14-19 illustrate a box clip 300 according to an illustrated embodiment of the subject application that is mounted to a rear side of an electrical box 302. As seen in FIG. 19, the electrical box 302 can include a perimeter wall 304 and back wall 306 similar to the perimeter wall 104, 204 and back wall 106, 206 of electrical boxes 100, 200 discussed above with respect to FIGS. 1 and 10, and can also be constructed in similar manners, and from similar materials. Accordingly, the perimeter wall 304 can include a plurality of sidewalls 308a-d that can be configured to provide a variety of shapes and sizes for the electrical box 302. Additionally, the perimeter wall 304 and the back wall 306 can generally define an inner region of the electrical box 302 that is similar to the inner regions 106, 206 discussed above. The electrical box 302 can also include one or more knockouts 122 along the perimeter wall 304 and/or the back wall 306.

The box clip 300 can be constructed from a variety of materials, including, for example, spring steel. The box clip 300 can include a lever 310, a first paddle 312a, and a second paddle 312b, a base portion 314 of the box clip 300 being positioned between the first paddle 312a and the second paddle 312b. The base portion 314, can be configured to be generally parallel to, and/or abut, the back wall 306 of the electrical box 302 when the box clip 300 is installed to the electrical box 302. As seen in at least FIGS. 16 and 17, a hanger clip 316 can extend generally from an upper portion of the inner side 318 of the base portion 314. The hanger clip 316, which can be orthogonal to the base portion 314, can include a first and second walls 322, 324 that intersect to form a hook 326 having a backward "L" shape. Accordingly, the hanger clip 316 can be configured to extend through a first opening 326 in the back wall 306 of the electrical box 302 such that at least a portion of the hook 324, such as, for example, the second wall 322, abuts against an inner surface of the back wall 306, such as, for example, and inner surface similar to the inner surface 118 shown in FIG. 1. Thus, according to certain embodiments, the second wall 322 can be generally parallel to the inner surface 118 of the back wall 306.

The lower portion of the base portion 314 can be attached to the lever 310. The lever 310 can be configured to be at least partially bendable, deflectable, or deformable from the base portion 314 and/or the box clip 300. According to certain embodiments, the lever 310 can include a first hinge segment 328 and a second segment 330 that are separated by a space 332. The first and second hinge segments 328, 330 can have a size, such as, for example, a width, that can accommodate bending, deflection, or deformation of the first and second hinges segments 328, 330 such that the lever 310 is displaceable from a first positon to a second position.

Figure 16:
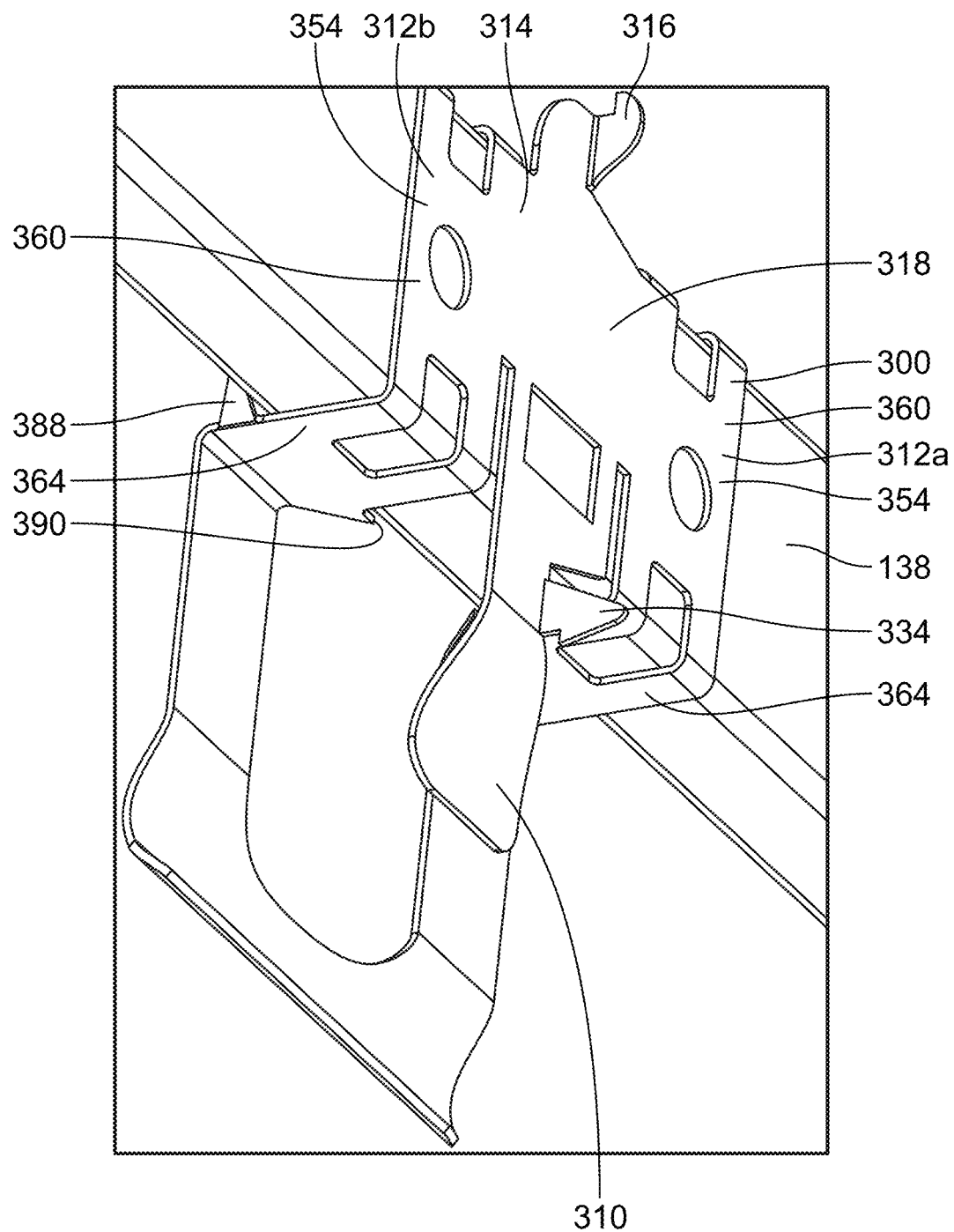
FIG. 16 illustrates a front perspective view of the box clip shown in FIG. 14 without an electrical box.
Figure 17:
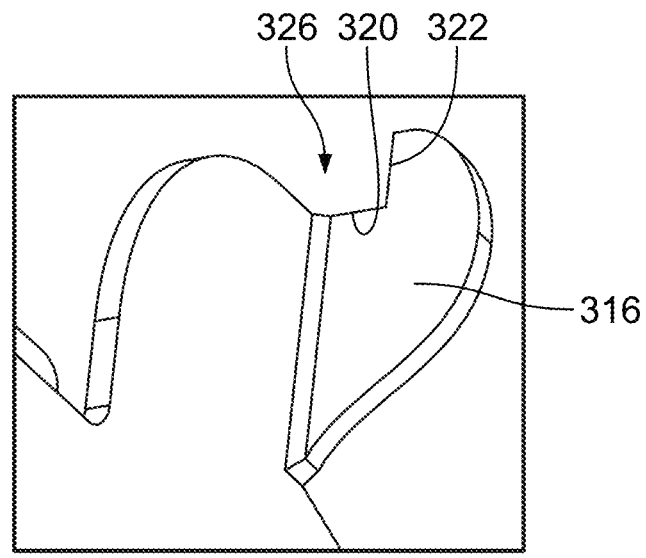
FIGS. 17 and 18 illustrate enlarged perspective views of an exemplary hanger clip and a hold clip, respectively, for the of the box clip shown in FIG. 16.

The lever 310 includes a hold clip 334 that extends from an inner side 336 of the lever 310, as seen in at least FIGS. 16 and 18. According to the illustrated embodiment, the hold clip 334 includes an upper wall 338 and a lower wall 340 that can outwardly extend from the lever 310 in in a direction toward the electrical box 302, as well as are sloped in generally converging directions. The lower wall 340 of the hold clip 334 can include, adjacent to the inner side 336 of the lever 310, a notch or hook 342 that includes generally orthogonal walls 344a, 344b that can, form a recess 346 in the lower wall 340 that is at least as wide as a thickness of the back wall 306 between opposing inner and outer surfaces 118. At least one wall 344a, 344b of the hook 342 of the hold clip 334 can be configured to, when a portion of the back wall 306 is positioned within the recess 346, abut at least a portion of the inner surface 118 of the back wall 306 of the electrical box 302. An inclined wall 348 of the lower wall 340 can extend from the hook 342 in an upward and outward sloped direction that generally converges with a downward and outward sloped configuration of the upper wall 338 at a tip 350 of the hold clip 334.

When securing the box clip 300 to the electrical box 302, the hanger clip 316 can be inserted into a first opening 326 in the back wall 306 such that the second wall 322 of the hanger clip 316 is at least positioned to abut against the inner surface 118 of the back wall 306 inside the electrical box 302. With the hanger clip 316 at such a position, at least a portion of the lower wall 340 of the hold clip 334 at or around the tip 350 of the hold clip 334 is positioned to be inserted into another, second opening 352 in the back wall 306. However, as the lower wall 340 has a slope that at least downwardly descends in a direction from the tip 350 toward the lever 310, the lower wall 340 at least in the vicinity of the hook 342 in the hold clip 334 is at a positon that can prevent the hook 342 for operably engaging the back wall 306. Moreover, the lower wall 340 of the hold clip 334 can be positioned at least initially, when the hanger clip 316 is positioned through the first opening and the inner region 106 of the box 302, to prevent the lower wall 340 of the hook 342 of the hold clip 334 from being inserted through the second opening 352 in the back wall 306, let alone be inserted into the inner region 106 of the electrical box 302 such that the portion of the back wall 306 of the electrical box 302 is positioned within the recess 346 of the hook 342. However, the lever 310 can at least temporarily be partially bent, deflected, or deformed from the first position to the second position such that the hold clip 334 can be inserted through the second opening 352 to a position at which the portion of the back wall 306 about the second opening 352 is received in the recess 346 of the hook 342. Further, as the lever 310 is being bent, deflected, or deformed, the sloped configuration of the lower wall 340 of the hold clip 334, and the associated sliding engagement of the lower wall 340 along an adjacent wall of the second opening 352 in the back wall 306 can at least assist in the displacement of the hold clip 334 through the second opening 352. With the hold clip 334, and moreover the hook 342 of the hold clip 334, securely engaged with the back wall 306, the lever 310 can return from its bent, deflected, or deformed condition of the second position to generally the shape and/or position the lever 310 had at the first position, and moreover before being bent, deflected, or deformed. Such a return to generally the same pre-bent, pre-deflected, or pre-deformed position or shape can be facilitated by the material used to form the box clip 300. Accordingly, in view of the foregoing, such a configuration of the hold clip 334, as well as the material of the box clip 300, can accommodate the hold clip 334 engaging the electrical box 302, when the hanger clip 316 is engaged with the electrical box 302 as previously discussed, via use of a snap fit.

The first and second paddles 312a, 312b can be positioned on opposing ends or sides of the base portion 314. Each of the first and second paddles 312a, 312b can include a base segment 354 having an inner surface 358 and an outer surface 360, and which is positioned between opposing upper and lower arms 362, 364 of the associated paddle 312a, 312b. The inner surface 358 of the base segment 354 can be configured to abut the outside surface 144 of the back wall 306 when the box clip 300 is attached to the box 302, while the outer surface 360 of base segment 354 is positioned to be adjacent to, and/or abut, and inner sidewall 172c (FIG. 16) of the bracket 138.

The upper arm 362 can include a first arm segment 366 having a proximate end that is connected to the base segment 354, the first arm segment 366 extending outwardly from the base segment 354. Thus, the first arm segment 366 can be positioned to be adjacent to, and/or abut, an upper wall of the bracket 138. A distal end of the first arm segment 366 can be connected to a second arm segment 368 which extends in a generally downward direction relative to the first arm segment 366. Thus, the second arm segment 368 is positioned to be generally adjacent to an outer sidewall 172d (FIG. 7B) of the bracket 138, the inner and outer sidewalls 172c, 172d of the bracket 138 being on opposing sides of the bracket 138. Thus, the upper arm 362 and adjacent portion of the base segment 354 can form a generally downward "U" shape, and can define an upper channel 370 for placement of at least a portion of the bracket 138.

The lower arm 364 can include a lower arm segment 372 that extends outwardly from the base segment 354 such that the base segment 354 is positioned to be adjacent to, and/or abut, a lower wall 172d of the bracket 138. For example, according to certain embodiments, at least prior to installation of the box clip 300 onto the bracket 138, the lower arm segment 372 of the lower arm 364 can be generally parallel to the first arm segment 366 of the upper arm 362. Additionally, according to certain embodiments, the lower arm segment 372 can be adjoined to the base segment 354 by one or more hinge segments 374 of the lower arm segment 372 and/or of the base segment 354, the hinge segments 374 accommodating at least partial bending or deflection of the lower arm segment 372 and/or base segment 354 as the box clip 300 is being mounted to the bracket 138. For example, insertion of the bracket 138 into the upper channels 370 of the upper arms 362 of the first and second paddles 312a, 312b may involve a degree of angular rotation of the box clip 300, and/or the electrical box 302 to which the box clip 300 is attached, relative to the bracket 138, which may remain relatively stationary. Thus, thus box clip 300 is being rotated into alignment with the bracket 138, angular misalignment of the bracket 138 and the box clip 300 may result in a force being asserted against the lower arm segment 372 that bends or deflects the hinge segments 374 of the lower arm segment 372 and/or base segment 354 in a direction(s) that can generally increase the linear distance between the distal ends 376, 378 of the second arm segment 368 of the upper arm 362 and the opposing lower arm segment 372, respectively. According to certain embodiments, such bending or deflection of the hinge segments 374 can be the result of a force cause by the engagement between the lower arm segment 372 and a portion of the bracket 138, such as, for example, a corner, as the box clip 300 is being rotated into alignment into mating alignment with bracket 138.

Alternatively, according to other embodiments, the lower arm segment 372 for each of the first and second paddles 312a, 312b can be connected to a handle 380, which, when pushed or pulled by an installer, can cause downward bending or deflection lower arm segment 372 at the hinge segments 374. According to the illustrated embodiment, the handle 380 is coupled to both of the first and second paddles 312a, 312b. For example, the handle 380 can include a first leg 382 that is attached to a distal end 378 of the lower arm segment 372 of the first paddle 312a, and a second leg 384 that is attached to a distal end 378 of the lower arm segment 372 of the second paddle 312b. The first and second legs 382, 384 of the handle 380 can be connected by a connector segment 386 that extends between the first and second legs 382, 384. During installation, when the box clip 300 is attached to the electrical box 302, an installer can exert a force against the connector segment 386, such as, for example a force that pushes or pulls the connector segment 386 generally toward the electrical box 302. Such force can result in the lower arm segment 372 being bent, deflected, or deformed in a manner that can increase the distance between the distal end 378 of the lower arm segment 372 and the distal end 376 of the second arm segment 368 of the upper arms 362. As previously discussed, such an increase in distance can assist in positioning the box clip 300 in alignment with the bracket 138 such that portions of the bracket 138 are in the upper channels 370 of the first and second upper arms 362, as well as position the lower arm segment 372 adjacent to the lower wall of the bracket 138. However, once the box clip 300 is aligned with the bracket 138, and the forces that had increased the separation between the distal end 378 of the lower arm segment 372 and the distal end 376 of the second arm segment 368 are removed, the resiliency of the configuration of the box clip 300 and/or the associated material, such as, for example, spring steel, can facilitate the lower arm segment 372 generally returning to the position or configuration the lower arm segment 372 had relative to at least the distal end 376 of the second arm segment 368 prior to the lower arm segment 372 having been bent, deflected, or deformed.

Figure 13:
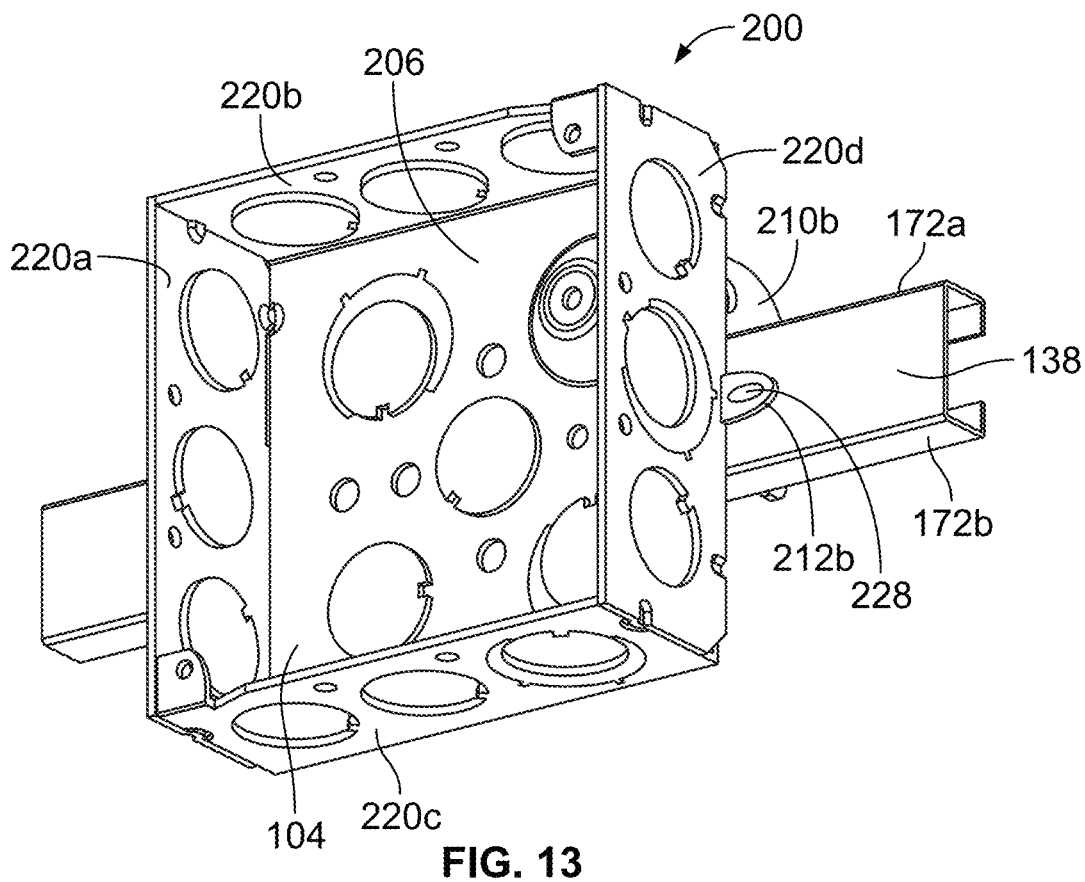
FIG. 13 illustrates a rear side perspective view of the electrical box shown in FIG. 10 positioned on an exemplary bracket.
Figure 14:
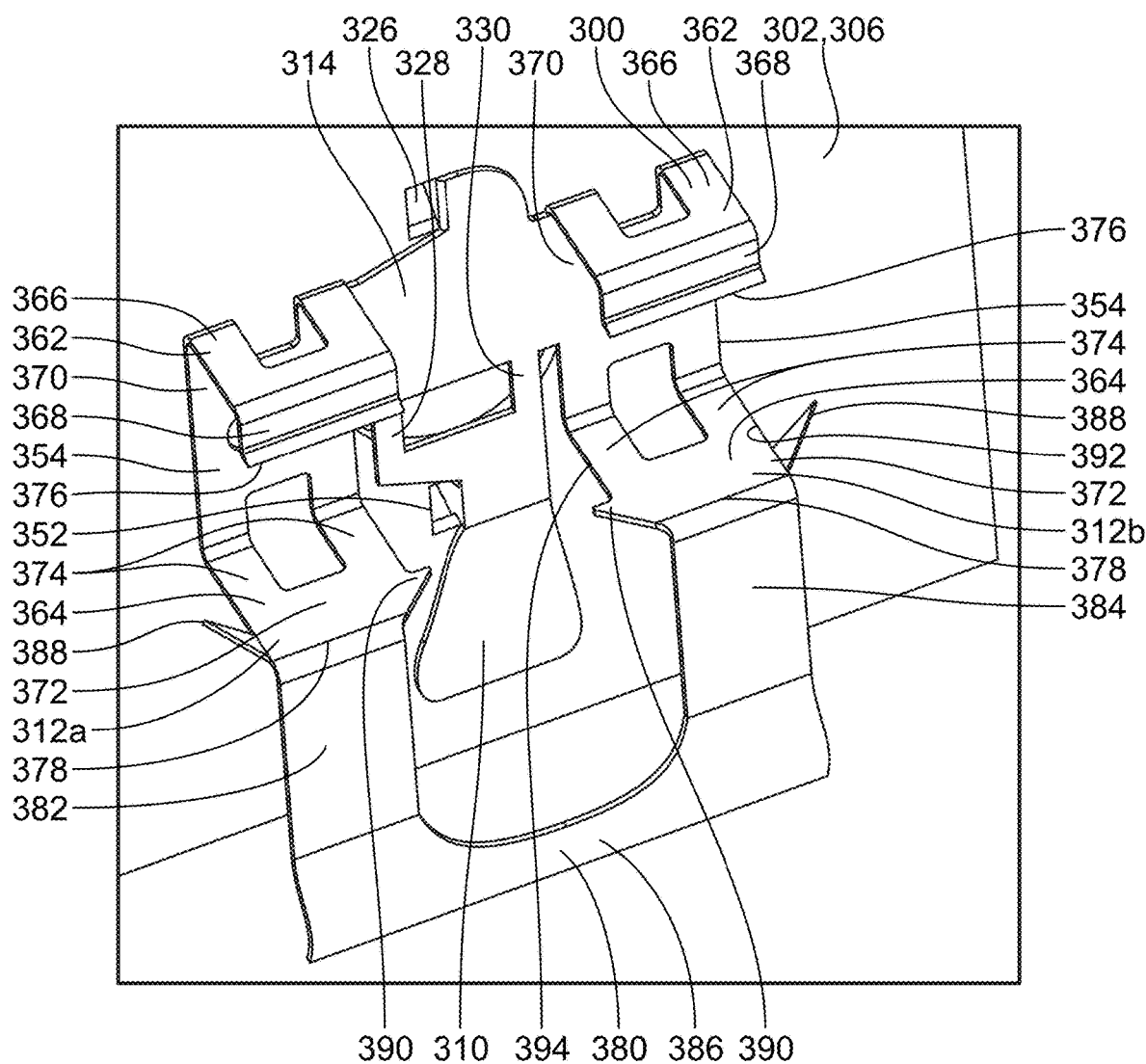
FIGS. 14 and 15 illustrate rear side perspective views of a box clip according to an illustrated embodiment of the subject application mounted to a rear side of an electrical box.
Figure 15:
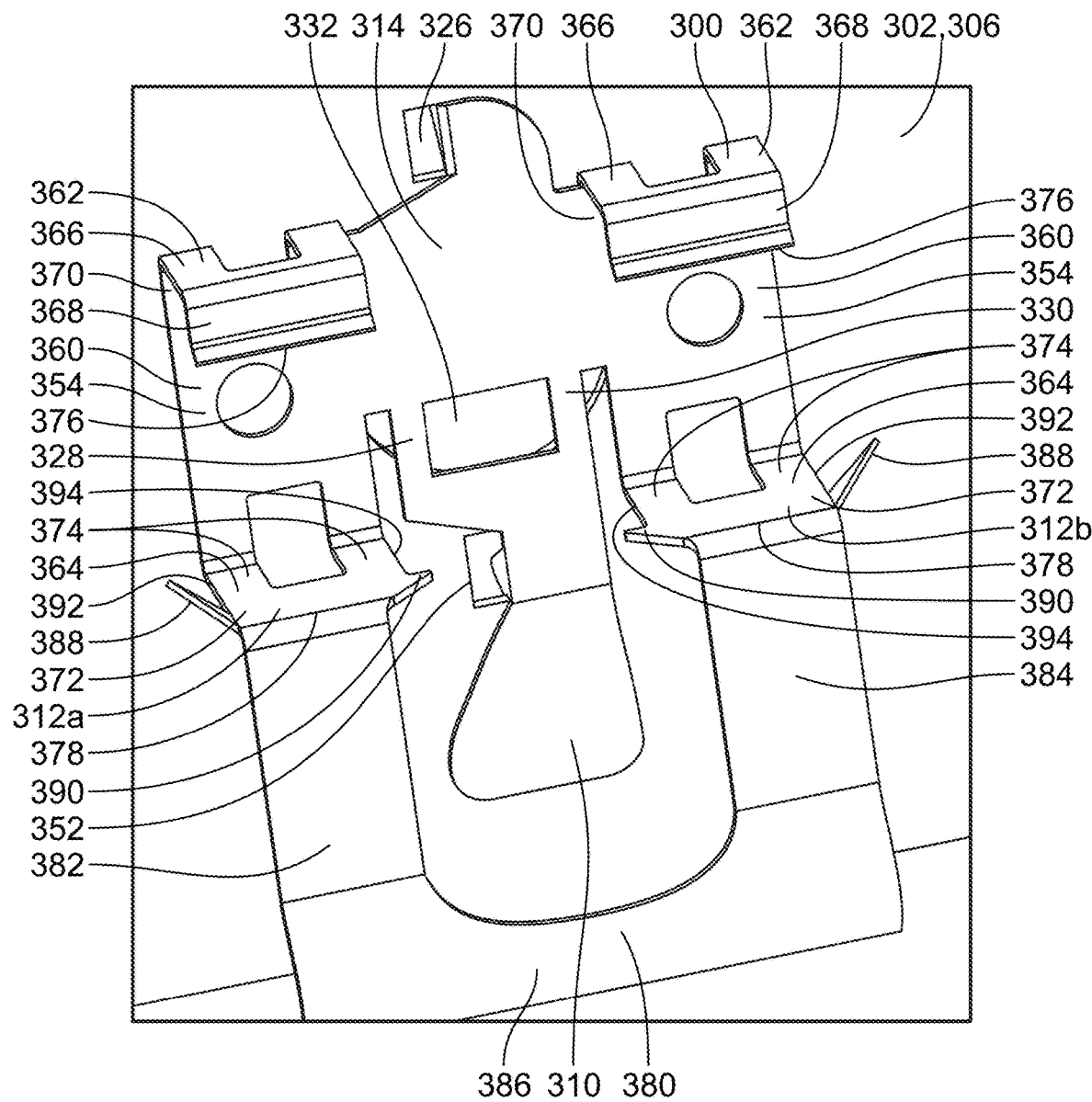

The lower arm 364 of one or both of the first and second paddles 312a, 312b can also include one or more teeth 388, 390 that can assist in securing the box clip 300 to the bracket 138. For example, as shown in at least FIG. 13, each lower arm segment 372 can include an outer tooth 388 and an inner tooth 390, the outer tooth 388 extending from an outer edge 392 of the lower arm segment 372, and the inner tooth 390 extending from an opposing inner edge 394 of the lower arm segment 372. The outer and inner teeth 388, 390 may initially be in a folded positon at which the outer and inner teeth 388, 390 can generally be coplanar with each other and/or the associated lower arm segment 372. Moreover, the outer and inner teeth 388, 390 can be generally folded so as to be at a position at which the outer and inner teeth 388, 390 do not interfere with the lower arm segment 372 moving to a position at which the lower arm segment 372 is adjacent to, and/or abuts, the lower wall 172d of the bracket 138 as the box clip 300 is being mounted to the bracket 138. With the box clip 300 mounted to the bracket 138, such as, for example, portions of the bracket 138 positioned in the upper channels 370 of the upper arms 362 of the first and second paddles 312a, 312b, and the lower arm segment 372 positioned beneath and/or abutting the lower wall 172d of the bracket 138, the outer and inner teeth 388, 390 can be bent into positions that may assist in preventing the box clip 300 from being dismounted from the bracket 138. For example, according to certain embodiments, the outer teeth 388 can be bent such that the outer teeth abuts the outer sidewall 172c of the bracket 138 that opposes the inner sidewall 172b that is adjacent to the base segment 354. Additionally, the inner teeth 390 can similarly be bent to a position at which the inner teeth 390 also abut the outer sidewall 172c of the bracket 138. Alternatively, the inner teeth 390 can be positioned and configured to be bent to a position at which the inner teeth 390 provide a degree of gripping into the lower wall 172d of the bracket 138. Additionally, according to the illustrated embodiment, the inner teeth 390 and outer teeth 388 can have a size such that, when bent, the height inner teeth 390 is less than the height of the outer teeth 388. Thus, the heights of the inner teeth 390 and outer teeth 388 are stepped such that, when folded, the inner teeth 390 do not extend as high as the folded outer teeth 388.

After being mounted to the bracket 138, including after having the inner and outer teeth 388, 390 folded into position, as discussed above, the position of the box clip 300, and thus, the electrical box 302, along the bracket 138 can be adjusted. For example, with respect to horizontally mounted brackets 138, the horizontal position of the electrical box 302 can be adjusted by exerting a force against the connector segment 386, such as, for example a force that pushes or pulls the connector segment 386 generally toward the electrical box 302. As previously discussed, such a force can result in the lower arm segment 372 being bent, deflected, or deformed in a manner that can increase the distance between the distal end 378 of the lower arm segment 372 and the distal end 376 of the second arm segment 368 of the associated upper arm 362. Such an increase in distance can assist disengage the outer and inner teeth 388, 390 from the bracket 138, as well we separate at least a portion of the lower arm segment 372 from the adjacent lower wall 172d of the bracket 138 while portions of the bracket 138 remain in the upper channels 370 of the upper arms 362. The box clip 300 can then be slid along the bracket 138, thereby adjusting the position of the electrical box 302 relative to at least the bracket 138. When the electrical box 302 reaches a selected position, the force the installer had been asserting against the connector segment 386 can be released. With the force released, the resiliency of the configuration of the box clip 300 and/or the associated material of the box clip 300 can facilitate the lower arm segment 372 then generally returning to the position or configuration the lower arm segment 372 had relative to at least the distal end 376 of the second arm segment 368 prior to the lower arm segment 372 having been bent, deflected, or deformed. The return of the lower arm segment 372 to such a position can include the inner and outer teeth 388, 390 returning to engagement with the bracket 138 in a manner that may resist further displacement of the box clip 300 along the bracket 138.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A device comprising:
   an electrical box having a perimeter wall and a back wall, the perimeter wall and an inner surface of the back wall defining an inner region of the electrical box, the inner region extending to an open end at a front side of the electrical box; and
   a mounting assembly coupled to a rear side of the electrical box, the mounting assembly comprising a first clip, a second clip, a first tab, and a second tab,
   wherein the first and second clips are on opposing sides of the electrical box, each of the first and second clips comprising a first leg and a second leg, the first leg extending outwardly from the rear side of the electrical box, the second leg extending from, and being generally orthogonal to, the first leg,
   wherein the first and second tabs are on opposing sides of the electrical box, the first and second tabs each being selectively foldable from a first position to a second position, the first tab being adjacent to an end of the second leg of the first clip when at the second position, and the second tab being adjacent to an end of the second leg of the second clip when at the second position, and
   wherein the first clip and a portion of the back wall are configured to define at least a portion of a first channel that is sized for placement of a portion of a mounting bracket, an open end of the first channel being open when the first tab is at the first position and closed when the first tab is at the second position, and
   wherein the second clip and another portion of the back wall are configured to define at least a portion of a second channel that is sized for placement of another portion of the mounting bracket, an open end of the second channel being open when the second tab is at the first position and closed when the second tab is at the second position.

2. The device of claim 1, wherein, when the device is at a first angular orientation, the first clip is vertically positioned above the first tab, and the second tab is vertically positioned above the second clip.

3. The device of claim 2, wherein the second leg of the first clip extends from the first leg of the first clip in a direction that is opposite to a direction that the second leg of the second clip extends from the first leg of the second clip.

4. The device of claim 1, wherein the first tab, the first clip and a first sidewall of the perimeter wall are part of a monolithic structure, and the second tab, the second clip and a second sidewall of the perimeter wall are part of a monolithic structure, the first and second sidewalls being on opposing sides of the perimeter wall.

5. The device of claim 1, wherein the first tab, the first clip, the second tab, the second clip, and the back wall form a monolithic structure.

6. The device of claim 1, wherein at least a portion of an inner surface of the first and second clips includes a plurality of teeth.

7. The device of claim 1, wherein, for each of the first and second channels, the open end is positioned between a distal end of the second leg and the back wall, and wherein the open end is sized and positioned to accommodate simultaneous rotational insertion of the portions of the mounting bracket into both of the first and second channels.

8. The device of claim 1, wherein, for each of the first and second tabs, when at the second position, a portion of an edge of the corresponding first and second tab contacts a distal end of the adjacent second leg.

9. The device of claim 8, wherein the portion of the edge has a rounded or sloped configuration.

10. A device comprising:

an electrical box having a perimeter wall and a back wall, the perimeter wall and an inner surface of the back wall defining an inner region of the electrical box, the inner region extending to an open end at a front side of the electrical box; and a mounting assembly comprising at least one hook body and at least one attachment segment, wherein the at least one hook body comprises a first leg and a second leg, the first leg being coupled to the back wall and extending in an outwardly direction away from the electrical box, the second leg being coupled to a distal end of the first leg and extending in a downwardly direction, the first leg, the second leg, and a portion of the back wall defining a channel sized for placement of a portion of a mounting bracket, wherein the at least one hook body comprises a first hook body and a second hook body, the first hook body separated from the second hook body by a pap, wherein a portion of an inner surface of each of the first and second hook bodies includes a plurality of teeth, and wherein the at least one attachment segment extends outwardly from a sidewall of the perimeter wall and away from the electrical box, the at least one attachment segment including an aperture sized to receive placement of a fastener.

11. The device of claim 10, wherein the at least one attachment segment comprises a first attachment segment and a second attachment segment, the first and second attachment segments extending outwardly from the electrical box in opposing directions that are generally orthogonal to the outwardly direction that the first leg extends from the electrical box.

12. A device comprising:

a base portion positioned between a first paddle and a second paddle, a hanger clip outwardly extending from an inner wall of the base portion, the hanger clip including a first hook positioned and structured to engage a first portion of a wall of an electrical box;

a lever extending from a lower portion of the base portion and positioned between the first and second paddles, the lever being selectively displaceable relative to at least a portion of the base portion, the lever including a hold clip that outwardly extends from an inner surface of the lever, the hold clip including a second hook to engage a second portion of the wall of the electrical box;

wherein each of the first and second paddles include an upper arm, a lower arm, and a base segment, the upper and lower arms being positioned on opposing sides of the base segment, the upper arm having a first segment and a second segment, the first segment extending from the base segment to the second segment, the base segment and the second segment positioned to engage opposing walls of a mounting bracket, and the lower arm having a lower arm segment that outwardly extends from the base segment, the lower arm segment and the first segment positioned to be adjacent to opposing sides of the mounting bracket, the lower arm segment being selectively displaceable relative to at least a portion of the base segment, and wherein the lower arm of each of the first and second paddles includes a first tooth and a second tooth, the first tooth and the second tooth being positioned at opposing edges of the lower arm.

13. The device of claim 12, wherein the hanger clip comprises a first wall and a second wall, the first wall extending outwardly from the inner wall of the base portion and the second wall extending upwardly for a distal end of the first wall.

14. The device of claim 13, wherein the hold clip includes an upper wall and a lower wall, the lower wall including the second hook, and wherein at least a portion of the lower wall is upwardly sloped in a direction toward the upper wall.

15. The device of claim 12, wherein the lever is coupled to the base portion by at least one hinge member, the at least one hinge member configured to accommodate selective displacement of the lever relative to the base portion.

16. The device of claim 12, further including the electrical box, a back wall of the electrical box having a first opening sized to receive insertion of the hanger clip, and a second opening of the electrical box sized to receive insertion of the hold clip at least when the hanger clip is positioned in the first opening.

17. The device of claim 12, wherein the lower arm segment is coupled to the base segment by at least one hinge segment, the at least one hinge segment configured to accommodate selective bending of the lower arm segment relative to the base segment.

18. The device of claim 12, wherein a distal end of the lower arm segment of the first paddle is coupled to a distal end of the lower arm segment of the second paddle by a handle.

19. The device of claim 12, wherein each of the first tooth and the second tooth are foldable from a first position to a second position, the first tooth and the second tooth being generally coplanar with the lower arm segment when at the first position, and, wherein the first tooth is structure to have a height at the second position that is different than a height of the second tooth when the second tooth is at the second position.

* * * * *